(12) United States Patent
Sunazuka

(10) Patent No.: US 11,464,171 B2
(45) Date of Patent: Oct. 11, 2022

(54) GARDENING TRIMMER

(71) Applicant: Makita Corporation, Anjo (JP)

(72) Inventor: Ryo Sunazuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 124 days.

(21) Appl. No.: 17/123,618

(22) Filed: Dec. 16, 2020

(65) Prior Publication Data
US 2021/0195845 A1 Jul. 1, 2021

(30) Foreign Application Priority Data

Dec. 25, 2019 (JP) .............................. JP2019-235269

(51) Int. Cl.
*A01G 3/053* (2006.01)
*F16H 25/14* (2006.01)
*A01G 3/04* (2006.01)

(52) U.S. Cl.
CPC ............. *A01G 3/053* (2013.01); *F16H 25/14* (2013.01); *A01G 2003/0461* (2013.01)

(58) Field of Classification Search
CPC ...... A01G 3/047; A01G 3/0475; A01G 3/053; A01G 2003/0461; F16H 25/14
USPC ................................................... 30/215, 216
See application file for complete search history.

(56) References Cited

U.S. PATENT DOCUMENTS

| | | | | |
|---|---|---|---|---|
| 5,689,887 A | * | 11/1997 | Heywood | A01G 3/053 30/220 |
| 6,170,159 B1 | * | 1/2001 | Kramer | A01G 3/053 30/216 |
| 6,263,579 B1 | * | 7/2001 | Nagashima | A01G 3/053 30/216 |
| 7,320,384 B2 | * | 1/2008 | Huang | A01G 3/053 384/472 |
| 7,788,811 B2 | * | 9/2010 | Hanada | A01G 3/053 30/210 |
| 8,732,959 B2 | * | 5/2014 | Lugert | A01G 3/053 30/216 |
| 8,931,574 B2 | * | 1/2015 | Watanabe | A01G 3/053 30/369 |
| 9,357,711 B2 | * | 6/2016 | Kato | A01G 3/053 |
| 9,610,700 B2 | * | 4/2017 | Hittmann | A01G 3/053 |
| 9,736,991 B2 | * | 8/2017 | Hanada | A01G 3/053 |

(Continued)

FOREIGN PATENT DOCUMENTS

| | | | | |
|---|---|---|---|---|
| DE | 102020007709 A1 | * | 7/2021 | ............. A01G 3/053 |
| JP | 2013-158273 A | | 8/2013 | |
| JP | 2015-104362 A | | 6/2015 | |

*Primary Examiner* — Jason Daniel Prone
(74) *Attorney, Agent, or Firm* — Sughrue Mion, PLLC

(57) ABSTRACT

A gardening trimmer may include: a first blade connected to a first cam member and configured to reciprocate in response to rotation of the first cam member; and a second com connected to a second cam member and configured to reciprocate in opposite phase to the first blade in response to rotation of the second cam member. The first cam member includes a first eccentric cam configured to revolve around a first rotation axis and is connected to the first blade at the first eccentric cam. The second cam member includes a second eccentric cam configured to revolve around a second rotation axis and is connected to the second blade at the second eccentric cam. Each of the first and second blades is configured to reciprocate along a plane including the first and second rotation axis.

16 Claims, 7 Drawing Sheets

(56) References Cited

U.S. PATENT DOCUMENTS

| | | | |
|---|---|---|---|
| 9,961,839 B2* | 5/2018 | Stones | A01G 3/053 |
| 10,798,876 B2* | 10/2020 | Milus | A01G 3/053 |
| 11,185,015 B2* | 11/2021 | Chung | A01G 3/053 |
| 2008/0196376 A1* | 8/2008 | Berti | A01G 3/053 30/393 |
| 2012/0017447 A1* | 1/2012 | Nie | A01G 3/053 30/228 |
| 2013/0025135 A1* | 1/2013 | Gejervall | A01G 3/053 30/216 |
| 2013/0031785 A1* | 2/2013 | Kaupp | A01G 3/053 30/223 |
| 2013/0326885 A1* | 12/2013 | Kaupp | A01G 3/053 30/208 |
| 2015/0223401 A1* | 8/2015 | Schiedt | A01G 3/053 30/216 |
| 2021/0144929 A1* | 5/2021 | Li | A01G 3/053 |
| 2021/0360863 A1* | 11/2021 | Kitahara | A01G 3/053 |

* cited by examiner

GARDENING TRIMMER

CROSS-REFERENCE TO RELATED APPLICATION(S)

This application claims priority to Japanese patent application No. 2019-235269, filed on Dec. 25, 2019, the entire contents of which are incorporated herein by reference.

TECHNICAL FIELD

The disclosure herein relates to a gardening trimmer such as a hedge trimmer and a lawn trimmer.

BACKGROUND

Various types of gardening trimmers such as hedge trimmers and lawn mowers are known. Generally, a gardening trimmer is provided with a prime mover (such as an engine or a motor), cam members driven by the prime mover to be rotated, and a pair of blades respectively connected to the cam members. The pair of blades is configured to reciprocate in phases opposite to each other in response to rotary motions of the cam members. For example, Japanese Patent Application Publication No. 2015-104362 describes an example of the gardening trimmer.

SUMMARY

The cam members include a first eccentric cam connected to a first blade and a second eccentric cam connected to a second blade. The first eccentric cam and the second eccentric cam are offset in directions opposite from each other with respect to rotation axes of the cam members. Due to this, the pair of blades reciprocates in the opposite phases to each other when the cam members rotate. In the reciprocation, a reaction force from the first blade acts on the first eccentric cam and a reaction force from the second blade acts on the second eccentric cam. Positions and magnitudes of these two reaction threes change cyclically in accordance with rotations of the cam members, which causes vibration in the gardening trimmer and noise accompanying the vibration.

In view of the above, the disclosure herein provides art to reduce vibration and noise in a gardening trimmer.

SUMMARY

The present teachings provide a gardening trimmer that may comprise: a prime mover; a first cam member configured to be driven by the prime mover to rotate in one direction about a first rotation axis; a second cam member configured to be driven by the prime mover to rotate in another direction about a second rotation axis parallel to the first rotation axis at a same cycle as the first cam member; a first blade connected to the first cam member and configured to reciprocate in response to rotation of the first cam member; and a second blade connected to the second cam member and configured to reciprocate in an opposite phase to the first blade in response to rotation of the second cam member. The first cam member may comprise a first eccentric cam configured to revolve around the first rotation axis and is connected to the first blade at the first eccentric cam. The second cam member may comprise a second eccentric cam configured to revolve around the second rotation axis and is connected to the second blade at the second eccentric cam. Each of the first blade and the second blade may be configured to reciprocate along a plane including the first rotation axis and the second rotation axis.

According to the above configuration, a positional relationship of the first eccentric cam and the second eccentric cam can be maintained such that at least a part of a reaction force that acts on the first eccentric cam from the first blade is counteracted by a reaction force that acts on the second eccentric cam from the second blade regardless of rotating positions of the first cam member and the second cam member. Due to this, the vibration in the gardening trimmer and the noise generated thereby are significantly reduced.

DETAILED DESCRIPTION

Figure 1:
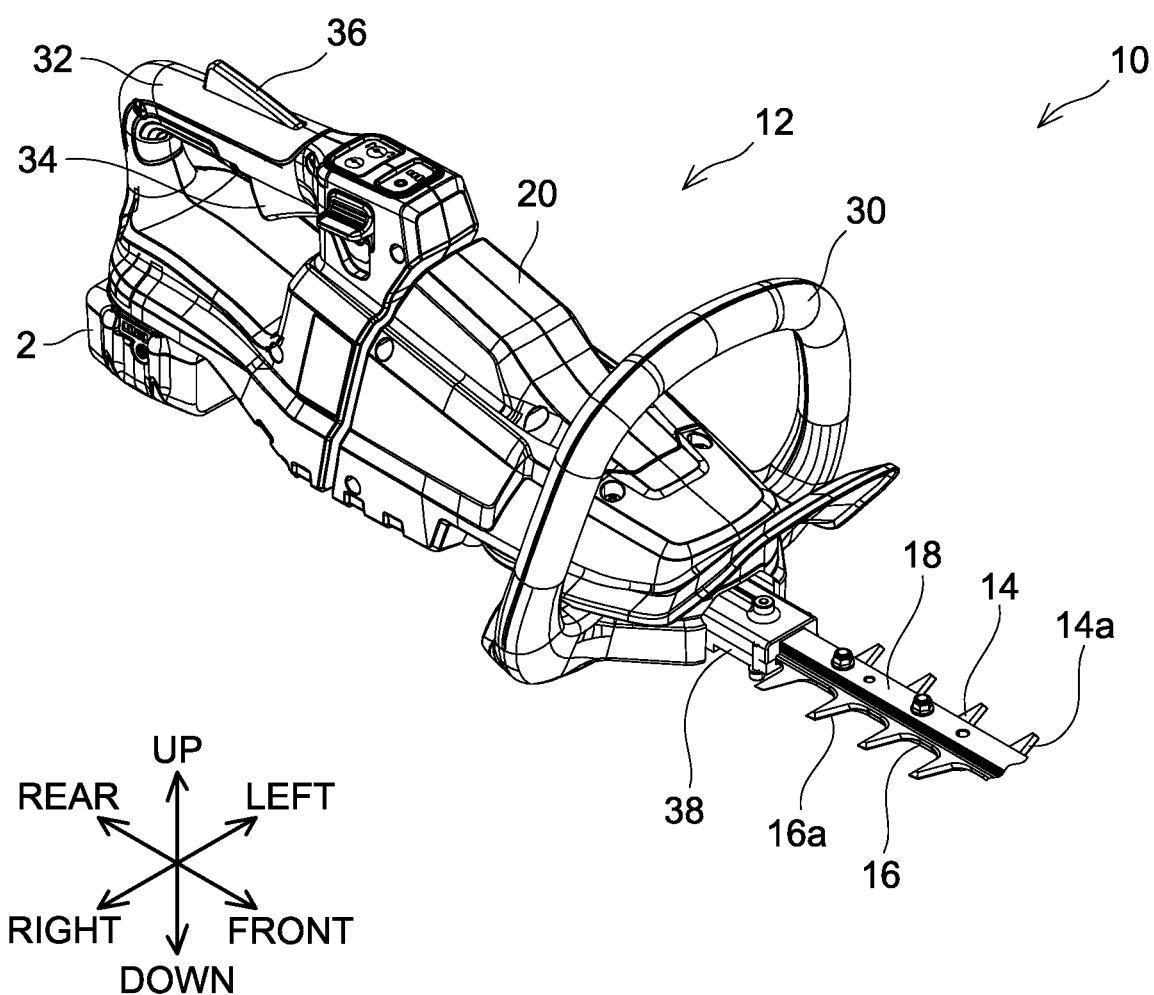
FIG. 1 is a perspective view showing an outer appearance of a gardening trimmer 10 of an embodiment.

In an embodiment of the art disclosed herein, a first rotation axis and a second rotation axis may be spaced apart from each other in a first direction (for example, a front-rear direction). In this case, each of a first blade and a second blade may be configured to reciprocate along the first direction. Alternatively in another embodiment, a first cam member and a second cam member may be disposed coaxially. That is, the first rotation axis may match the second rotation axis.

In an embodiment of the art disclosed herein, the first eccentric cam and the second eccentric cam may each be configured to revolve on a same plane perpendicular to the first rotation axis and the second rotation axis. According to such a configuration, more of a reaction force that acts on the first eccentric cam from the first blade can be counteracted by a reaction force that acts on the second eccentric cam from the second blade.

In an embodiment of the art disclosed herein, a radius of an orbit along which the first eccentric cam is configured to revolve may be equal to a radius of an orbit along which the second eccentric cam is configured to revolve. In this case, although not particularly limited, an amplitude of reciprocation of the first blade may be equal to an amplitude of reciprocation of the second blade. Alternatively in another embodiment, the radius of the orbit along which the first eccentric cam is configured to revolve may be different from the radius of the orbit along which the second eccentric cam is configured to revolve. That is, the amplitude of the reciprocation of the first blade may be different from the amplitude of the reciprocation of the second blade.

In an embodiment of the art disclosed herein, one of the first cam member and the second cam member may be connected to a prime mover via another of the first cam member and the second cam member. Such a configuration enables establishment of a mechanism for driving the two cam members by the prime mover with a relatively simple configuration. Alternatively in another embodiment, each of the first cam member and the second cam member may be connected to the prime mover without intervention of the other.

In the embodiment described above, the first cam member may include a first gear. In this case, the second cam member may include a second gear engaged with the first gear. Such a configuration enables establishment of a mechanism for rotating the two cam members in opposite directions with a relatively simple configuration.

In the embodiment described above, the first gear may be provided on an outer peripheral surface of the first cam member and the second gear may be provided on an outer peripheral surface of the second cam member. According to such a configuration, relatively large torque can be transmitted between the first cam member and the second cam member.

In an embodiment of the art disclosed herein, at least one of the first eccentric cam or the second eccentric cam may be connected to a corresponding one of the first blade or the second blade via at least one link. Alternatively in another embodiment, at least one of the first eccentric cam or the second eccentric cam may be directly connected to the corresponding one of the first blade or the second blade.

In an embodiment of the art disclosed herein, the first eccentric cam may be connected to the first blade via a first link and the second eccentric cam may be connected to the second blade via a second link. That is, each of the first eccentric cam and the second eccentric cam may be connected to the corresponding one of the first blade or the second blade via at least one link.

In the embodiment described above, the first link may include a first base portion including a groove or a slot into which the first eccentric cam fits loosely and two first connection portions extending from the first base portion toward the first blade. The second link may include a second base portion including a groove or a slot into which the second eccentric cam fits loosely and a second connection portion extending from the second base portion toward the second blade. In this case, the second connection portion may be located between the two first connection portions and extend parallel with the two first connection portions.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved gardening trimmers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A gardening trimmer 10 of an embodiment will be described with reference to the drawings. The gardening trimmer 10 is a gardening tool used primarily for trimming hedges and trees, and is also called a hedge trimmer. As shown in FIG. 1, the gardening trimmer 10 includes a body 12 and a pair of blades 14, 16 extending forward from the body 12. The pair of blades 14, 16 is supported by a guide bar 18 fixed to the body 12. The guide bar 18 extends forward from the body 12 along the pair of blades 14, 16. The gardening trimmer 10 is configured to reciprocate the pair of blades 14, 16 in a front-rear direction in opposite phases to cut branches and leaves of hedges and tress.

The pair of blades 14, 16 includes a first blade 14 and a second blade 16. The first blade 14 has a plurality of blade edges 14a provided along the front-rear direction (first direction). Each of the blade edges 14a protrudes from the first blade 14 in a right-left direction (second direction). Similarly, the second blade 16 has a plurality of blade edges 16a provided along the front-rear direction. Each of the blade edges 16a protrudes from the second blade 16 in the right-left direction. When the first blade 14 and the second blade 16 reciprocate in opposite phases along the front-rear direction, the blade edges 14a of the first blade 14 and the blade edges 16a of the second blade 16 repeatedly cross each other. Due to this, branches of a hedge are cut, for example. Here, the front-rear direction and the right-left direction intersect each other perpendicularly, and a direction that intersects the front-rear direction and the right-left direction perpendicularly will be termed an up-down direction.

The body 12 is configured to detachably receive a battery pack 2. That is, the gardening trimmer 10 of the present embodiment is a cordless power tool that uses the battery pack 2 as a power source. Here, the number of the battery pack 2 is not limited to one, and the gardening trimmer 10 may be configured to use two or more battery packs 2. As another embodiment, the gardening trimmer 10 may be a power tool that is to be connected to an external AC power source or DC power source via a cable. Alternatively, the gardening trimmer 10 may be an engine-driven tool.

Figure 2:
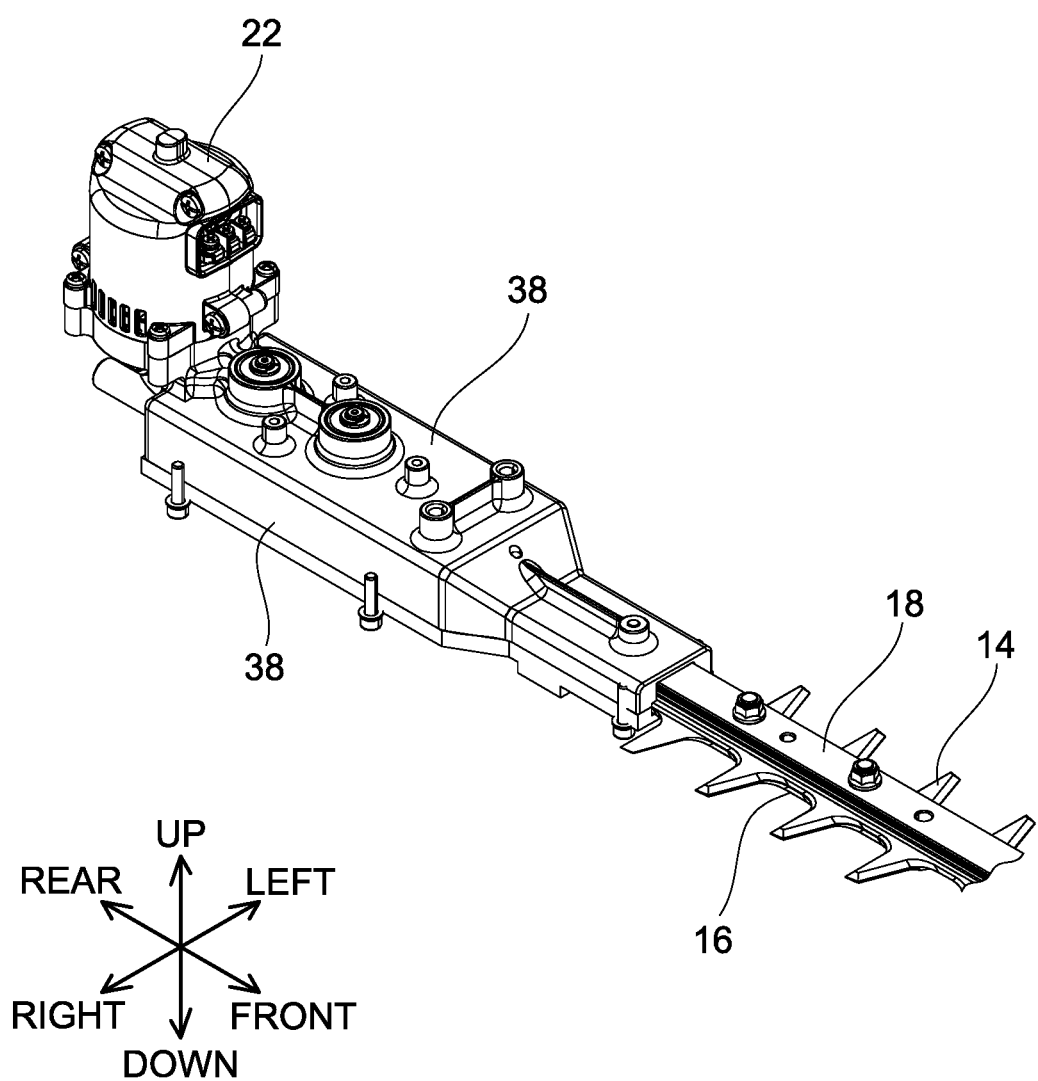
FIG. 2 is a perspective view showing internal mechanisms of the gardening trimmer 10.

As shown in FIGS. 1 and 2, the body 12 includes a housing 20, a cam casing 38 fixed to the housing 20, and a motor 22 fixed to the cam casing 38 inside the housing 20. The motor 22 is a prime mover configured to drive the pair of blades 14, 16, and is configured to operate by power supplied from the battery pack 2. The housing 20 includes a front grip 30 and a rear grip 32. These grips 30, 32 are configured to be held by a user. The user normally operates the gardening trimmer 10 by holing the front grip 30 with his/her left hand and the rear grip 32 with his/her right hand.

The rear grip 32 includes a drive switch 34 and an unlock switch 36. When the user operates the drive switch 34, power is supplied from the battery pack 2 to the motor 22, the motor 22 thereby drives the pair of blades 14, 16. The drive switch 34 is mechanically locked inside the housing 20 in its normal state, and a mechanical lock of the drive switch 34 is released only during when the unlock switch 36 is operated. Due to this, the pair of blades 14, 16 is prevented from being driven unintentionally by an erroneous operation performed on the drive switch 34.

Figure 3:
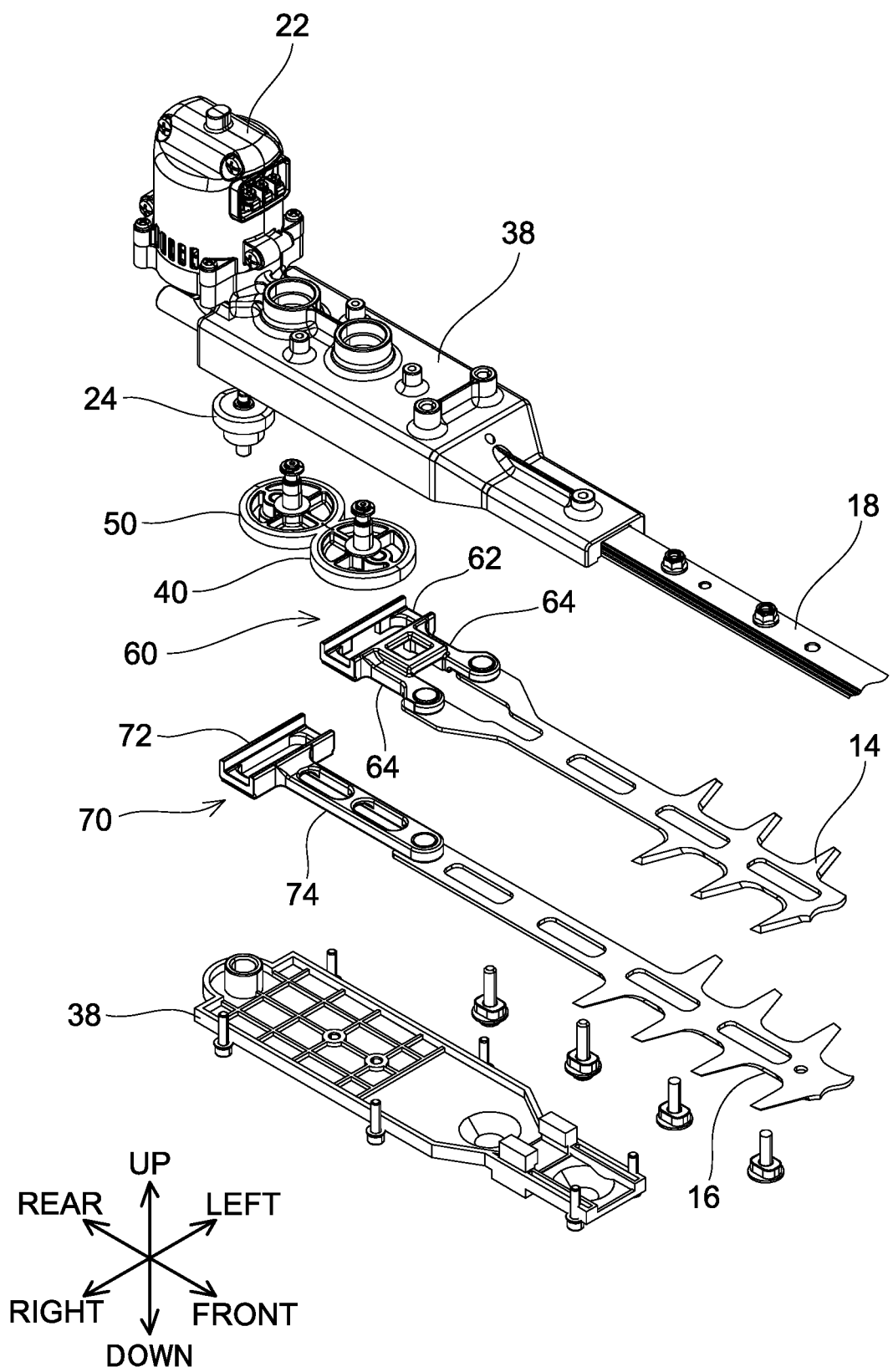
FIG. 3 is a perspective view showing the internal mechanisms of the gardening trimmer 10 in a disassembled state.
Figure 4:
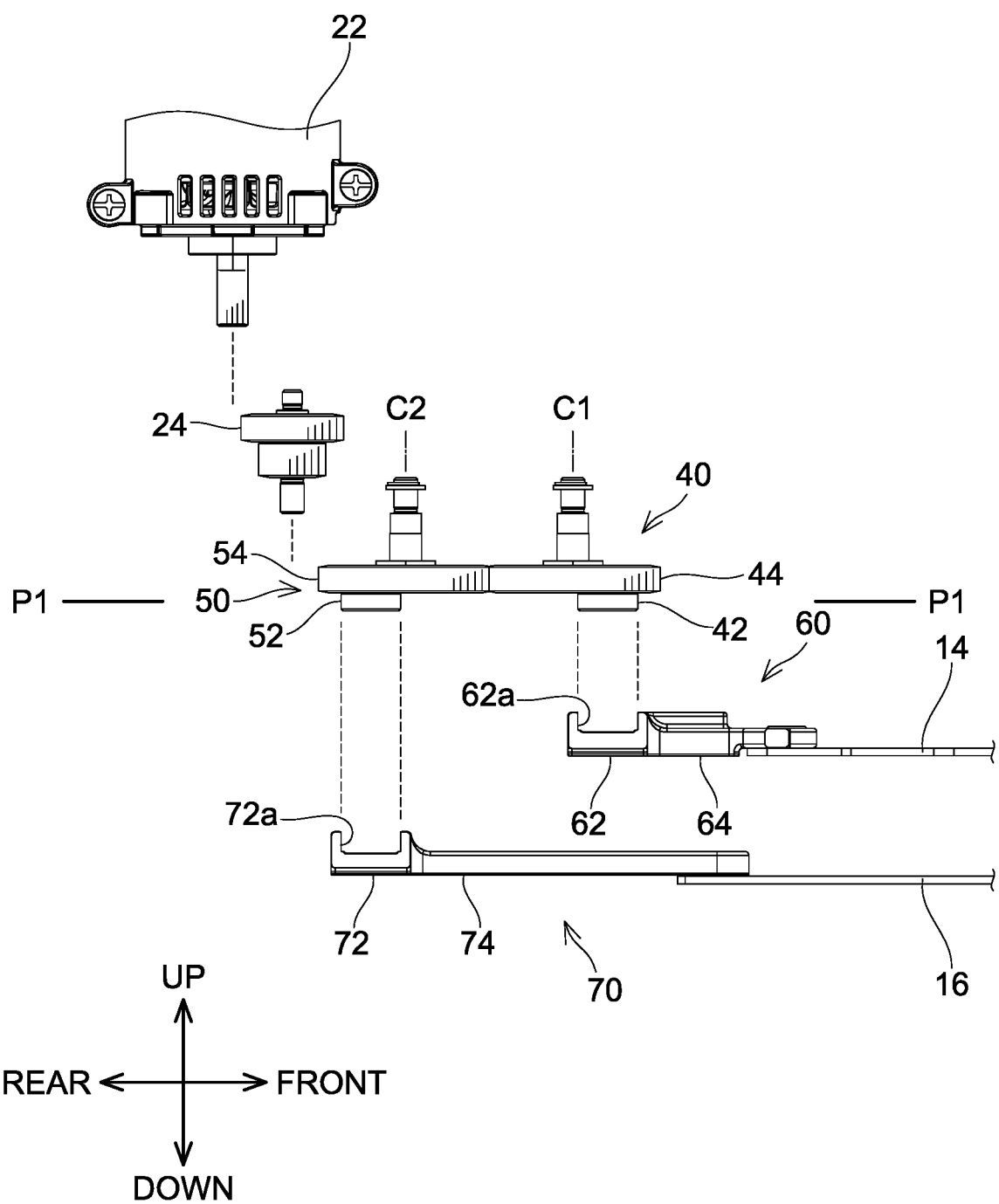
FIG. 4 is a side view showing a part of the internal mechanisms of the gardening trimmer 10 in a disassembled state.

As shown in FIGS. 3 and 4, the gardening trimmer 10 is provided with a first cam member 40 and a second cam member 50. Although not particularly limited, the first cam member 40 and the second cam member 50 are constituted of metal. The first cam member 40 and the second cam member 50 are located within the cam casing 38 and are held rotatably by the cam casing 38. More specifically, the first cam member 40 is rotatably supported about a first rotation axis C1 and the second cam member 50 is rotatably supported about a second rotation axis C2. The first rotation axis C1 and the second rotation axis C2 are parallel to each other and are spaced apart in the front-rear direction. In other words, a plane including the first rotation axis C1 and the second rotation axis C2 (as indicated by a line P2 in FIG. 5) is parallel to the front-rear direction, that is, the plane is parallel to the direction along which the pair of blades 14, 16 reciprocates. In yet other words, a line that intersects perpendicularly with the first rotation axis C1 and the second rotation axis C2 (which is also indicated by the line P2 in FIG. 5) is parallel to the direction along which the pair of blades 14, 16 reciprocates.

The first cam member 40 and the second cam member 50 are connected to the motor 22 and are driven to rotate by the motor 22. Although this is merely an example, the first cam member 40 includes a first gear 44 and the second cam member 50 includes a second gear 54. The number of teeth of the first gear 44 is equal to the number of teeth of the second gear 54. Although not particularly limited, the first gear 44 is an external gear and is provided on an outer peripheral surface of the first cam member 40. Similarly, the second gear 54 is an external gear and is provided on an outer peripheral surface of the second cam member 50. The first gear 44 of the first cam member 40 is engaged with the second gear 54 of the second cam member 50. Further, the second gear 54 of the second cam member 50 is connected to the motor 22 via a reduction gear 24. That is, the reduction gear 24, the second gear 54, and the first gear 44 constitute one array of geartrain., and the first cam member 40 is connected to the motor 22 via the second cam member 50. Further, the first cam member 40 and the second car member 50 are configured to rotate in opposite directions at the same cycle (that is, at the same rotation speed).

Figure 5:
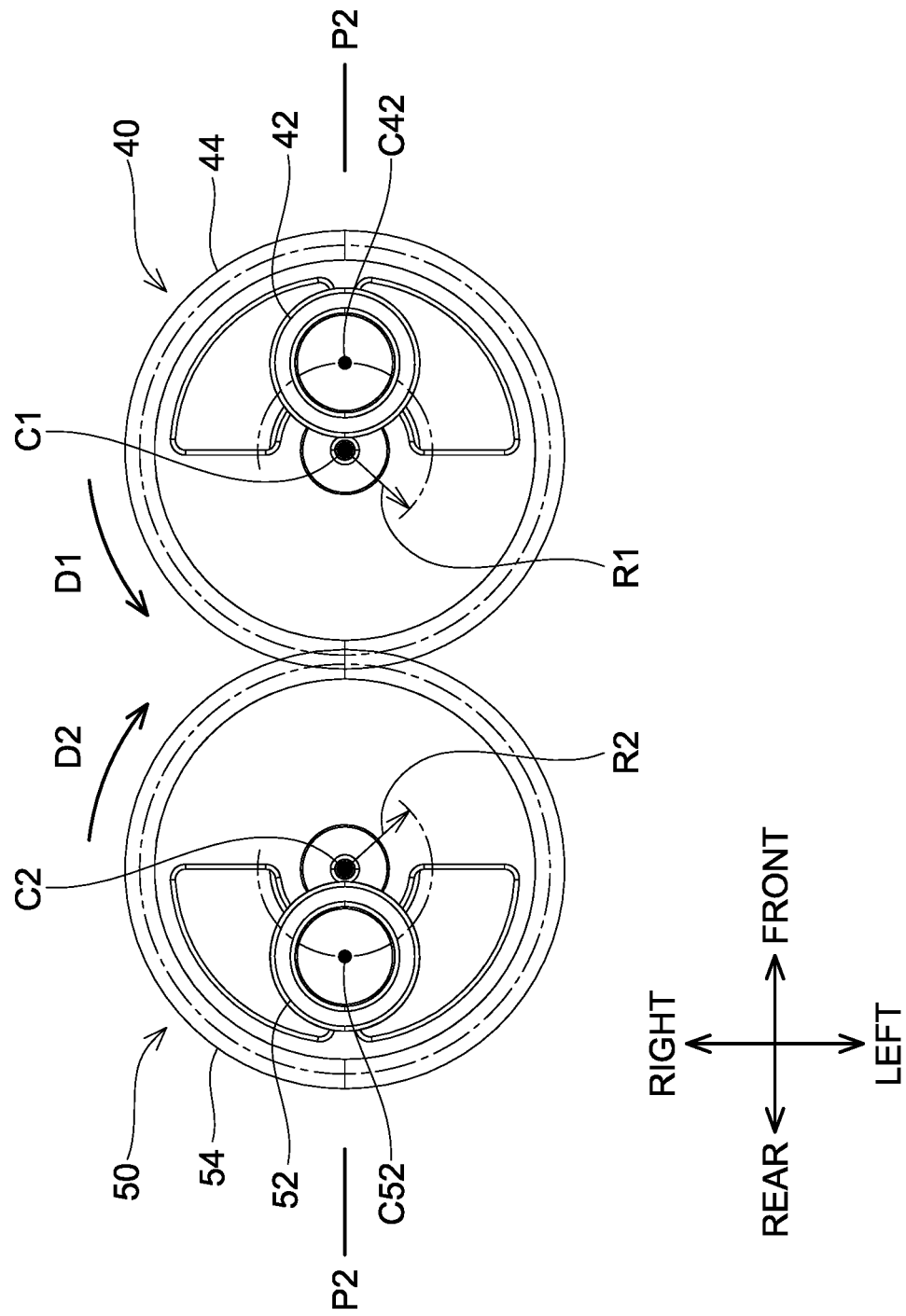
FIG. 5 is a bottom view seeing a first cam member 40 and a second cam member 50 front below.

As shown in FIGS. 4 and 5, the first cam member 40 includes a first eccentric cam 42. The first eccentric cam 42 protrudes downward from the first cam member 40. The first eccentric cam 42 has a disk-like or columnar shape, and a center axis C42 of the first eccentric cam 42 is parallel to the first rotation axis C1 of the first cam member 40 and is spaced apart from the first rotation axis C1. Due to this, when the first cam member 40 rotates about the first rotation axis C1, the first eccentric cam 42 revolves around the first rotation axis C1. Although not particularly limited, in the first cam member 40 of the present embodiment, the first eccentric cam 42 is supported rotatably (configured to rotate) about its center axis C42.

Similarly, the second cam member 50 includes a second eccentric cam 52. The second eccentric cam 52 protrudes downward from the second cam member 50. The second eccentric cam 52 has a disk-like or columnar shape, and a center axis C52 of the second eccentric cam 52 is parallel to the second rotation axis C2 of the second cam member 50 and is spaced apart from the second rotation axis C2. Due to this, when the second cam member 50 rotates about the second rotation axis C2, the second eccentric cam 52 revolves around the second rotation axis C2. Here, a radius R2 of an orbit along which the second eccentric cam 52 revolves is equal to a radius R1 of an orbit along which the first eccentric cam 42 revolves. Although not particularly limited, in the second cam member 50 as well, the second eccentric cam 52 is supported rotatably (configured to rotate) about its center axis C52. Further, the second eccentric cam 52 is located on the same plane as the first eccentric cam 42 (as indicated by a line P1 in FIG. 4). More specifically, although not particularly limited, a center of gravity of each of the first eccentric cam 42 and the second eccentric cam 52 is located on the same plane (P1) and revolves on the same plane (P1).

The first eccentric cam 42 of the first cam member 40 is connected to the first blade 14 via a first link 60. Due to this, when the first cam member 40 rotates about the first rotation axis C1, the first blade 14 reciprocates along the front-rear direction. In the reciprocation, an amplitude of reciprocation of the first blade 14 is equal to the radius R1 of the orbit along which the first eccentric cam 42 revolves. Similarly, the second eccentric cam 52 of the second cam member 50 is connected to the second blade 16 via a second link 70. Due to this, when the second cam member 50 rotates about the second rotation axis C2, the second blade 16 reciprocates along the front-rear direction. In the reciprocation, an amplitude of reciprocation of the second blade 16 is equal to the radius R2 of the orbit along which the second eccentric cam 52 revolves. As aforementioned, since the radius R2 of the orbit along which the second eccentric cam 52 revolves is equal to the radius R1 of the orbit along which the first eccentric cam 42 revolves, the amplitude of the reciprocation of the second blade 16 is equal to the amplitude of the reciprocation of the first blade 14. As another embodiment, the radius R2 of the orbit along which the second eccentric cam 52 revolves may be different from the radius R1 of the orbit along which the first eccentric cam 42 revolves.

Figure 6:
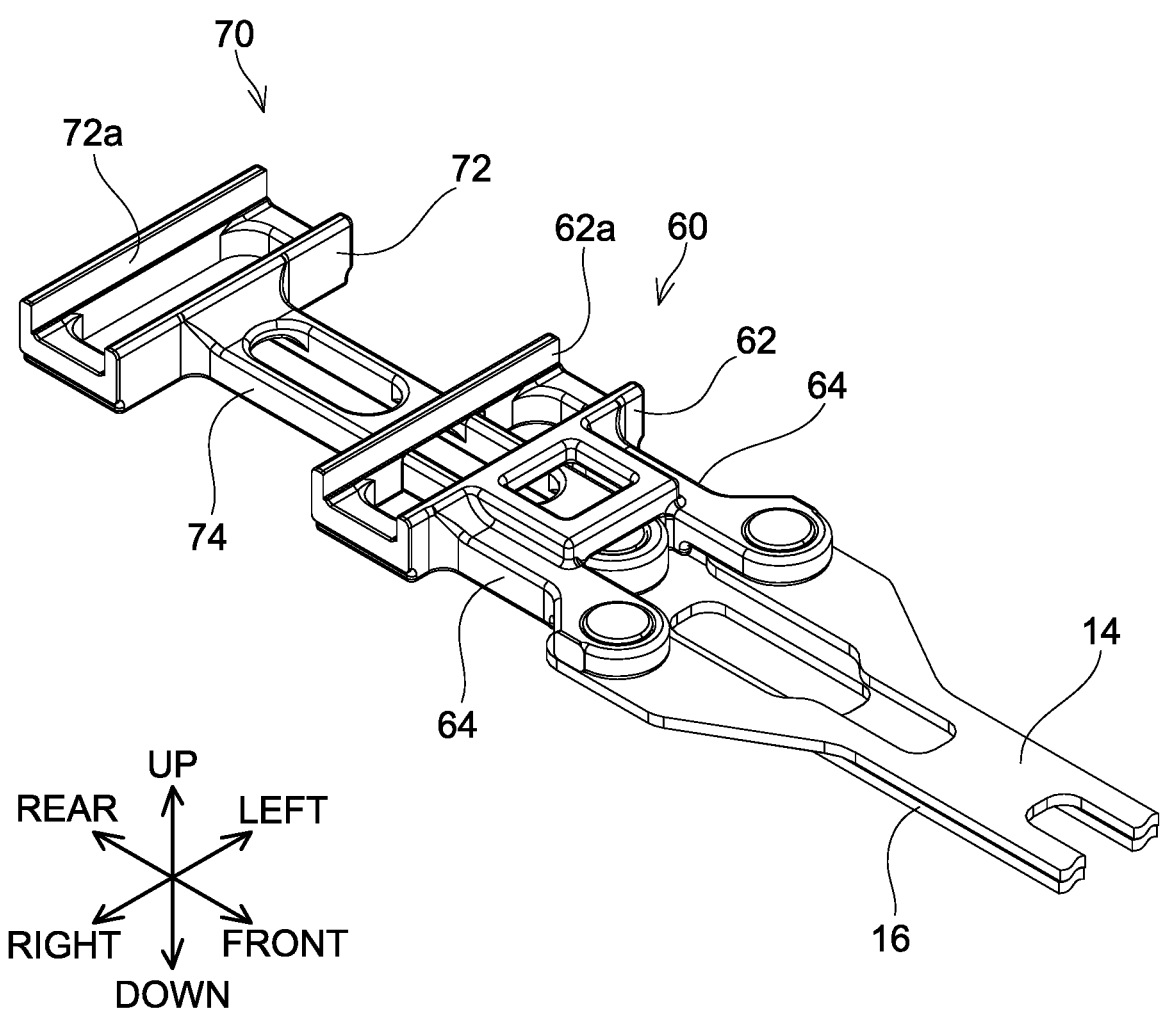
FIG. 6 is a perspective view showing a first link 60 and a second link 70.

Specific configurations of the first link 60 and the second link 70 are not particularly limited. Although this is merely an example, as shown in FIGS. 4 and 6, the first link 60 in the present embodiment includes a first base portion 62 and two first connection portions 64. The first base portion 62 includes a groove 62a (or slot) in which the first eccentric cam 42 fits loosely. The groove 62a (or slot) extends in the right-left direction. That is, a longitudinal direction of the groove 62a (or slot) is perpendicular to the front-rear direction along which the first blade 14 reciprocates. The two first connection portions 64 are parallel to each other and extend in the front-rear direction from the first base portion 62 toward the first blade 14. According to such a configuration, when the first eccentric cam 42 revolves around the first rotation axis C1, this first eccentric cam 42 can cause the first link 60 to reciprocate along the front-rear direction while moving inside the groove 62a of the first link 60 in the right-left direction. When the first link 60 reciprocates in the front-rear direction, the first blade 14 connected to the first link 60 also reciprocates along the front-rear direction.

The second link 70 has a similar structure as the first link 60. That is, the second link 70 includes a second base portion 72 and a second connection portion 74. The second base portion 72 includes a groove 72a (or slot) in which the second eccentric cam 52 fits loosely. The groove 72a (or slot) extends in the right-left direction. That is, a longitudinal direction of the groove 72a (or slot) is perpendicular to the front-rear direction along which the second blade 16 reciprocates. The second connection portion 74 extends in the front-rear direction from the second base portion 72 toward the second blade 16, and a part of the second connection portion 74 is located between the two first connection portions 64 of the first link 60. According to such a configuration, when the second eccentric cam 52 revolves around the second rotation axis C2, this second eccentric cam 52 can cause the second link 70 to reciprocate in the front-rear direction while moving inside the groove 72a of the second link 70 in the right-left direction. When the second link 70 reciprocates in the front-rear direction, the second blade 16 connected to the second link 70 also reciprocates along the front-rear direction.

As aforementioned, the first cam member 40 and the second cam member 50 rotate in the opposite directions at the same cycle (that is, at the same rotation speed). That is, in FIG. 7, when the first cam member 40 rotates in one direction D1, the second cam member 50 rotates in another direction D2. Due to this, the first eccentric cam 42 and the second eccentric cam 52 also rotate in opposite directions of each other at the same cycle (that is, at the same rotation speed). The first cam member 40 and the second cam member 50 are engaged with each other such that the second eccentric cam 52 is located at its rearmost position when the first eccentric cam 42 is located at its foremost position. Due to this, the first blade 14 and the second blade 16 reciprocate in opposite phases of each other at all times.

Figure 7A:
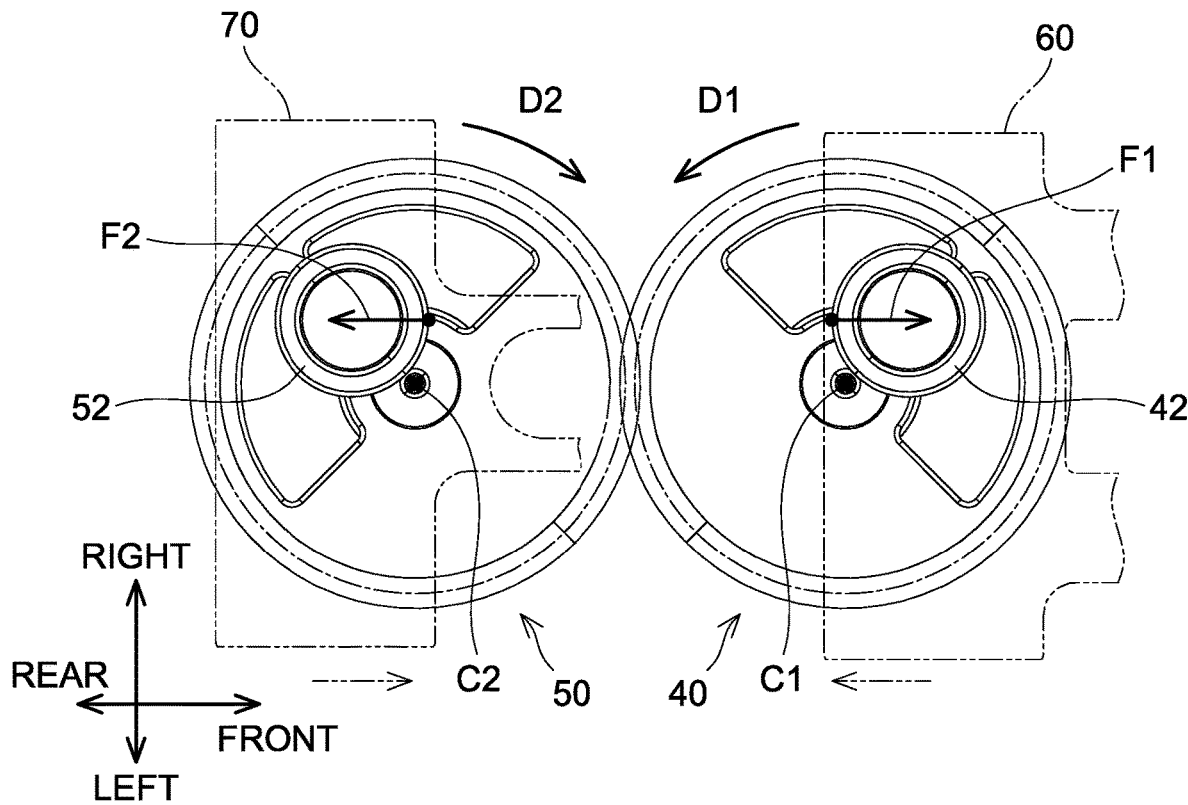
FIGS. 7A and 7B are diagrams showing reaction forces F1, F2 that respectively act on a first eccentric cam 42 and a second eccentric cam 52.
Figure 7B:
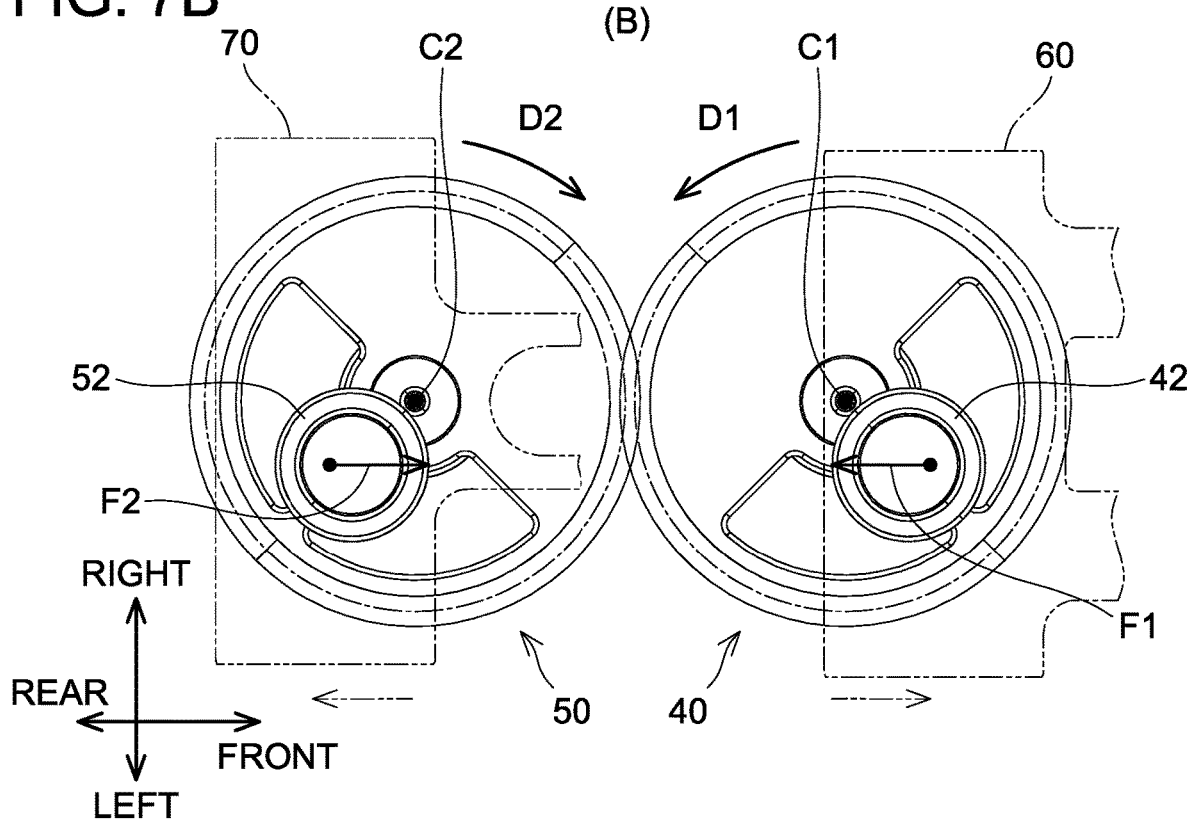

As shown in FIGS. 7A and 7B, when the first blade 14 and the second blade 16 reciprocate, a reaction force F1 from the first link 60 (that is, the first blade 14) acts on the first eccentric cam 42 and a reaction force F2 from the second blade 16 acts on the second eccentric cam 52. Positions and magnitudes of these two reaction forces F1, F2 change cyclically, which may cause vibration in the gardening trimmer 10 and noise accompanying the vibration. However, in the gardening trimmer 10 of the present embodiment, the first eccentric cam 42 and the second eccentric cam 52 are positioned collinearly in the front-rear direction at all times regardless of rotating positions of the first cam member 40 and the second cam member 50. Here, the reaction force F1 acts on the first eccentric cam 42 in the direction along which the first blade 14 reciprocates, that is, in the front-rear direction. Similarly, the reaction force F2 acts on the second eccentric cam 52 in the direction along which the second blade 16 reciprocates, that is, in the front-rear direction. Further, since the first blade 14 and the second blade 16 reciprocate in opposite phases of each other, the reaction forces F1, F2 in opposite directions of each other also act respectively on the first eccentric cam 42 and the second eccentric cam 52. As such, due to the first eccentric cam 42 and the second eccentric cam 52 being positioned collinearly in the front-rear direction, the reaction force F1 that acts on the first eccentric cam 42 is counteracted by the reaction force F2 that acts on the second eccentric cam 52. Due to this, the vibration in the gardening trimmer 10 and the noise accompanying the vibration are significantly reduced.

In the gardening trimmer 10 of the present embodiment, the first rotation axis C1 of the first cant member 40 and the second rotation axis C2 of the second cam member 50 are spaced apart from each other in the front-rear direction, and the first eccentric cam 42 and the second eccentric cam 52 are located on the same plane. However, as another embodiment, the first cam member 40 and the second cam member 50 may be arranged coaxially and thus the first eccentric cam 42 and the second eccentric cam 52 may not be located on the same plane. According to such a configuration as well, at least a part of the reaction force F1 that acts on the first eccentric cam 42 is counteracted by the reaction force F2 that acts on the second eccentric cam 52, and the vibration and the noise in the gardening trimmer 10 are significantly reduced. Even when the first cam member 40 and the second cam member 50 are arranged coaxially and thus the first rotation axis C1 matches the second rotation axis C2, each of the first blade 14 and the second blade 16 reciprocates along the plane including the first rotation axis C1 and the second rotation axis C2.

As aforementioned, the radius R1 of the orbit along which the first eccentric cam 42 revolves may be different from the radius R2 of the orbit along which the second eccentric cam 52 revolves. In this case as well, the first eccentric cam 42 and the second eccentric cam 52 are located on the same side at all times with respect to the plane including the first rotation axis C1 and the second rotation axis C2. That is, the second eccentric cam 52 is located on a left side with respect to the plane when the first eccentric cam 42 is located on the left side, and the second eccentric cam 52 is located on a right side with respect to the plane when the first eccentric cam 42 is located on the right side. Due to this, at least a part of the reaction force F1 that acts on the first eccentric cam 42 is counteracted by the reaction force F2 that acts on the second eccentric cam 52, by which the vibration and the noise in the gardening trimmer 10 are significantly reduced.

In the gardening trimmer 10 of the present embodiment, the first blade 14 and the second blade 16 are each configured to reciprocate in linear motion. However, a part of or an entirety of the techniques employed in the present embodiment may be employed in a gardening trimmer of which each blade is configured to reciprocate in pivoting motion. In this case, each of the blades reciprocates along an arc with a predetermined rotation axis as a center, and as such, the first, rotation axis C1 of the first cam member 40 and the second rotation axis C2 of the second cam member 50 may preferably be arranged along a tangential line of the arc. This satisfies the technical requirement of the art disclosed herein that each of the blades reciprocates along the plane including the first rotation axis C1 and the second rotation axis C2.

In the gardening trimmer 10 of the present embodiment, the blades 14, 16 are of a so-called double-edged type, and respectively have the blade edges 14a, 16a on their both sides. However, the blades 14, 16 may be of a so-called single-edged type respectively having the blade edges 14a, 16a only on one side. Further, as another embodiment, the gardening trimmer 10 may be a pole hedge trimmer having a blade to be driven to reciprocate at a distal end of a long rod for cutting a high hedge, a ridge mower for cutting weeds on a ridge, or a scythe mower having blades arranged at a front side of a walk-behind mower and driven in the right-left direction with respect to a progressing direction.

What is claimed is:

1. A gardening trimmer, comprising:
a prime mover;
a first cam member configured to be driven by the prime mover to rotate in one direction about a first rotation axis;
a second cam member configured to be driven by the prime mover to rotate in another direction about a second rotation axis parallel to the first rotation axis at a same cycle as the first cam member;
a first blade connected to the first cam member and configured to reciprocate in response to rotation of the first cam member; and
a second blade connected to the second cam member and configured to reciprocate in an opposite phase to the first blade in response to rotation of the second cam member, wherein the first cam member comprises a first eccentric cam configured to revolve around the first rotation axis and is connected to the first blade at the first eccentric cam, the second cam member comprises a second eccentric cam configured to revolve around the second rotation axis and is connected to the second blade at the second eccentric cam, and each of the first blade and the second blade is configured to reciprocate along a plane including the first rotation axis and the second rotation axis.

2. The gardening trimmer according to claim 1, wherein the first rotation axis and the second rotation axis are spaced apart from each other in a first direction, and each of the first blade and the second blade is configured to reciprocate along the first direction.

3. The gardening trimmer according to claim 2, Wherein the first eccentric cam and the second eccentric cam are each configured to revolve on a same plane perpendicular to the first rotation axis and the second rotation axis.

4. The gardening trimmer according to claim 2, wherein one of the first cam member and the second cam member is connected to the prime mover via another of the first cam member and the second cam member.

5. The gardening trimmer according to claim 4, wherein the first cam member comprises a first gear, and the second cam member comprises a second gear engaged with the first gear.

6. The gardening trimmer according to claim 5, wherein the first gear is provided on an outer peripheral surface of the first cam member, and the second gear is provided on an outer peripheral surface of the second cam member.

7. The gardening trimmer according to claim 6, Wherein at least one of the first eccentric cam or the second eccentric cam is connected to a corresponding one of the first blade or the second blade via at least one link.

8. The gardening trimmer according to claim 7, wherein the first eccentric cam is connected to the first blade via a first link, and the second eccentric cam is connected to the second blade via a second link.

9. The gardening trimmer according to claim 8, wherein the first link comprises a first base portion including a groove or a slot into which the first eccentric cam fits loosely and two first connection portions extending from the first base portion toward the first blade, the second link comprises a second base portion including a groove or a slot into which the second eccentric cam fits loosely and a second connection portion extending from the second base portion toward the second blade, and the second connection portion is located between the two first connection portions and extends parallel with the two first connection portions.

10. The gardening trimmer according to claim 1, wherein a radius of an orbit along which the first eccentric cam is configured to revolve is equal to a radius of an orbit along which the second eccentric cam is configured to revolve.

11. The gardening trimmer according to claim 1, wherein one of the first cam member and the second cam member is connected to the prime mover via another of the first cam member and the second cam member.

12. The gardening trimmer according to claim 11, wherein the first cam member comprises a first gear, and the second cam member comprises a second gear engaged with the first gear.

13. The gardening trimmer according to claim 12, wherein the first gear is provided on an outer peripheral surface of the first cam member, and the second gear is provided on an outer peripheral surface of the second cam member.

14. The gardening trimmer according to claim 1, wherein at least one of the first eccentric cam or the second eccentric cam is connected to a corresponding one of the first blade or the second blade via at least one link.

15. The gardening trimmer according to claim 14, wherein the first eccentric cam is connected to the first blade via a first link, and the second eccentric cam is connected to the second blade via a second link.

16. The gardening trimmer according to claim 15, wherein the first link comprises a first base portion including a groove or a slot into which the first eccentric cam fits loosely and two first connection portions extending from the first base portion toward the first blade, the second link comprises a second base portion including a groove or a slot into which the second eccentric cam fits loosely and a second connection portion extending from the second base portion toward the second blade, and the second connection portion is located between the two first connection portions and extends parallel with the two first connection portions.

\* \* \* \* \*